Oct. 2, 1956

R. C. NORRIE ET AL 2,765,041

AIRPORT CRASH TRUCK

Filed March 28, 1950

INVENTORS:
Robert C. Norrie
Wallace M. Brown
BY
ATTORNEY

Oct. 2, 1956   R. C. NORRIE ET AL   2,765,041
AIRPORT CRASH TRUCK
Filed March 28, 1950   3 Sheets-Sheet 3
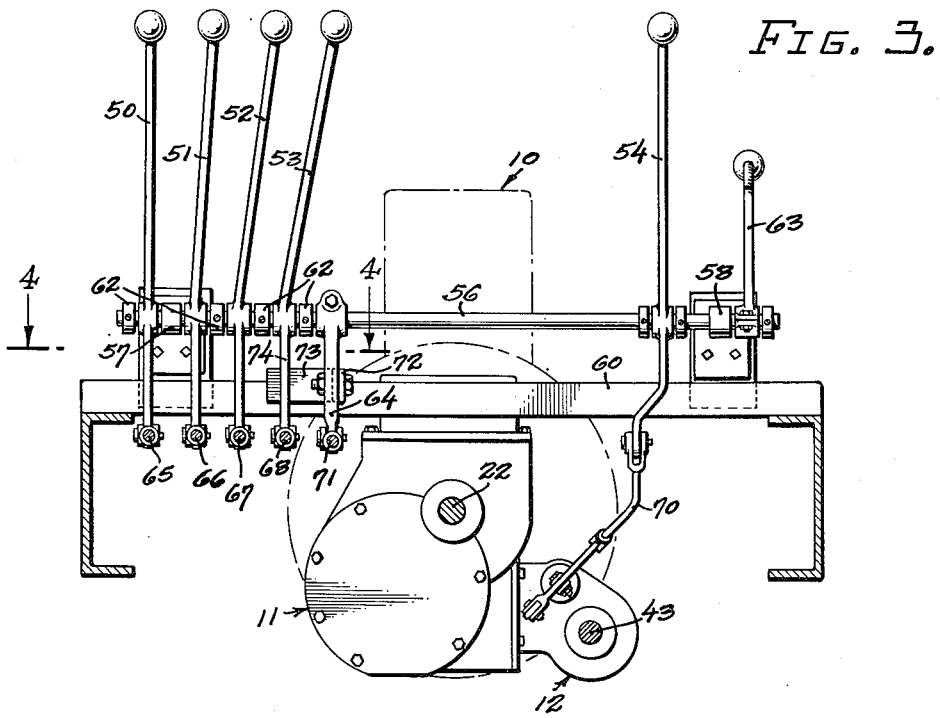
FIG. 3.
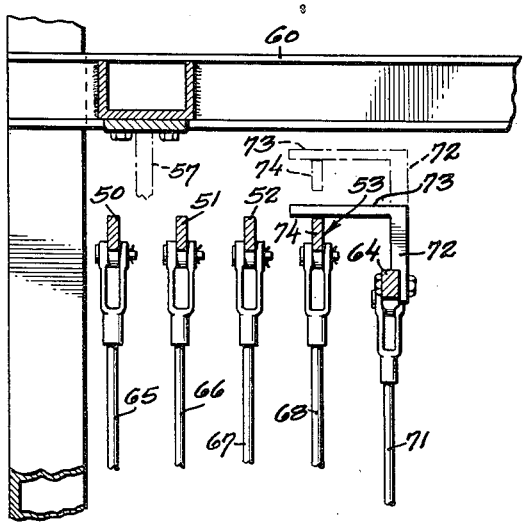
FIG. 4.
INVENTOR.
Robert C. Norrie
Wallace M. Brown
BY
ATTORNEY United States Patent Office 2,765,041
Patented Oct. 2, 1956

2,765,041

AIRPORT CRASH TRUCK

Robert C. Norrie and Wallace M. Brown, Seattle, Wash., assignors to Kenworth Motor Truck Corporation, Seattle, Wash., a corporation of Washington Application March 28, 1950, Serial No. 152,408

13 Claims. (Cl. 180—53)

This invention relates to an airport crash truck, and namely a truck for use in extinguishing fires which occur as the result of an airplane crash. In order that a truck for this purpose can satisfactorily perform its intended function, it becomes essential that the same reach the scene of the crash in the shortest possible time, and immediately upon arriving at the crash scene, be enabled to throw a high-pressure stream of chemical onto the plane. Each duty calls for a power plant of high horsepower rating. It furthermore becomes necessary that the truck be mobile while it is performing its fire-fighting duty and this is to say that the truck must admit of being freely manipulated into changing strategic positions around the burning plane. This on-the-scene mobility need not, however, call for any undue amount of power in that there is no call for quick acceleration or rapidity of travel in moving the truck from one position to another as the fire is being attacked. In the prior engineering of crash trucks it has been the custom to equip the same with two separate power plants, one serving as the instrumentality for driving the traction wheels and the other being employed to power the pump. Aside from the added cost incident to the use of two separate engines, both necessarily of high horsepower rating, the net result of adding the very considerable weight of an extra engine is either to reduce the speed of the truck in getting to the scene of a crash or, in the alternative, the employment of a still larger wheel-driving power plant to offset the added weight. The present invention has for its principal object the provision of a crash truck requiring only a single engine to accomplish the ends hereinbefore outlined, and namely an assured high-speed travel to the scene of a crash and, upon arrival, full-power energy instantly available for powering the pump while at the same time providing for manipulation of the truck through energy so taken from the engine as to place no appreciable power-draining load upon the latter.

With this principal object in view, and having other objects and advantages in mind which will appear and be understood in the course of the following description and claims, the invention consists in the novel construction and in the adaptation and arrangement of parts hereinafter described and claimed.

In the accompanying drawings:

Fig. 3 is an enlarged transverse vertical sectional view on line 3—3 of Fig. 1; and Fig. 4 is a fragmentary horizontal section in line 4—4 of Fig. 3.

Figure 1:
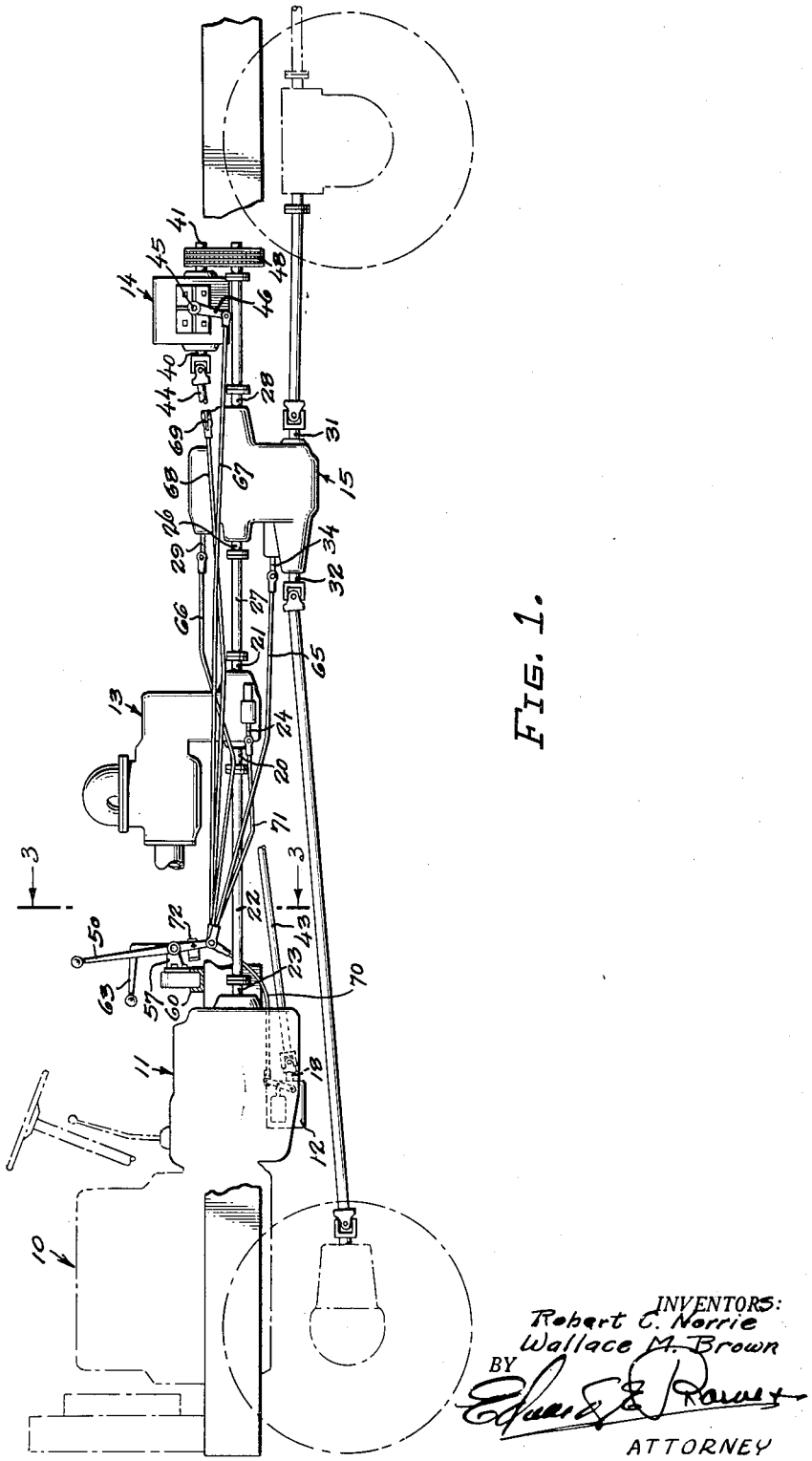
Figure 1 is a schematic side elevational view portraying a system according to the present invention by which power from a single power plant is trained to perform all duties necessary to the effective functioning of a crash truck.

The invention essentially lies in the power train and its controls. Included in this train is an internal-combustion engine designated by the numeral 10, together with a change-gear transmission having a power take-off, a pump, an auxiliary transmission, and a transfer case. All of these units are or may be of standard construction available on the open market, wherefor an illustration of their internal construction can serve no useful end and would, in fact, unnecessarily complicate the disclosure. We will herein expressly identify the particular units which we have found suitable for our system but it is not to be implied therefrom that other functionally similar structures made specially for the purpose or acquired from other manufacturers than those named would not be equally satisfactory.

Transmission

The transmission which we employ, and which we designate by 11, is equipped with a 1-speed unidirectional power take-off. The transmission is mounted directly to the rear of the engine and has said power take-off, denoted by 12, located at the right side; and for activation of this take-off there is provided a shuttle-pin 16 journaled for slide movement along an axis longitudinal to the vehicle. The shuttle pin acts through a rigidly attached shipping fork to impart shipping movements to a gear, the movement of the gear in fore and aft directions, respectively, between permitted limits of endwise slide movement putting the same into and out of mesh with a unidirectional power gear contained in the transmission's gear train. The gear which is subject to said shipping movement is splined to a stub output shaft 18.

Pump

The pump, denoted by 13, is mounted to the rear of the transmission 11. The only characteristics of this pump which need be here considered is that axially aligned input and output shafts 20 and 21, respectively, are provided at the front and rear ends thereof with the input shaft being direct-driven through a drive shaft 22 from the main output shaft 23 of the transmission. A gear splined for endwise movement upon the input shaft acts when moved to its forward limit of travel to pass power into the pump proper and when moved to its aft limit of travel to inactivate the pump and establish a driving couple from said input shaft to the output shaft. A shipping fork for said sliding gear is fixedly carried upon a shuttle-pin 24 which is journaled at the left side of the pump for slide movement in a direction longitudinally of the vehicle.

Transfer case

Figure 2:
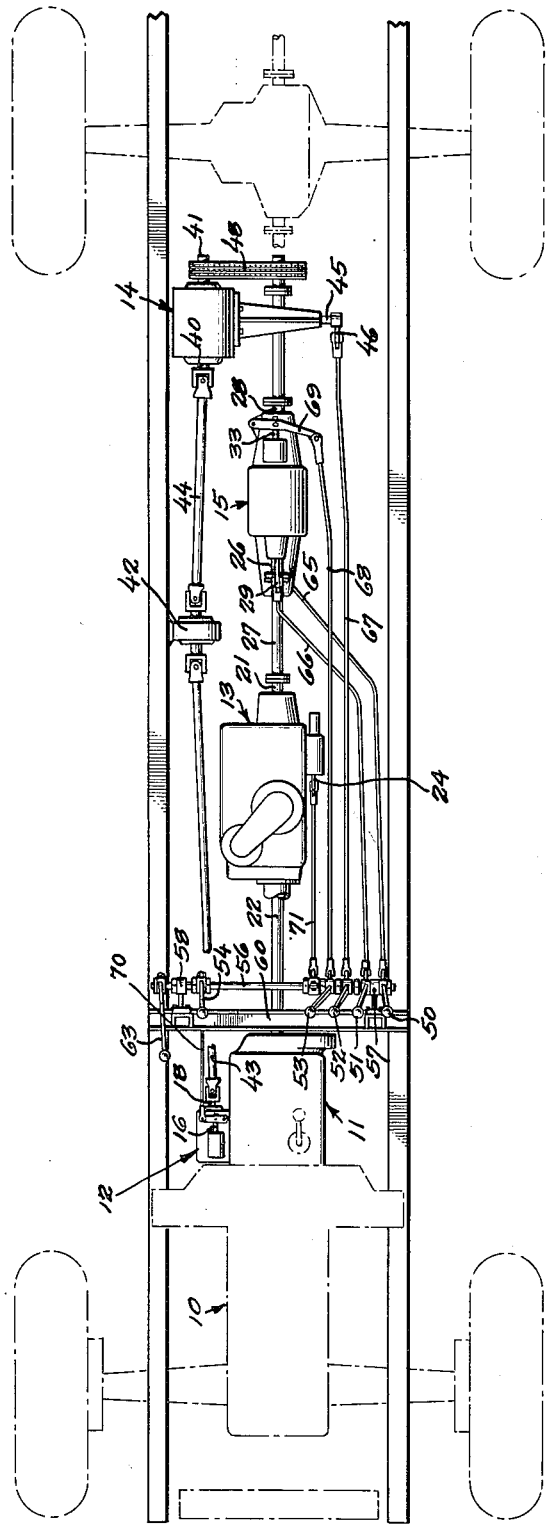
Fig. 2 is a top plan view thereof.

The transfer case 15 lies to the rear of the pump and presents an input shaft 26 exposed to the front and which we bring into driving couple with the pump's shaft 21 by a connecting shaft 27. Co-axial with this shaft 26 and selectively brought into and out of couple therewith by a sliding jaw-clutch is a second input shaft 28 exposed to the rear of the transfer case. The transfer case we employ is a two-speed unit for multiple drive vehicles. The case provides, with the two said input shafts, the usual drop gears and for selecting its two permitted speeds has a shipping fork carried upon a shuttle-pin 29, the shuttle-pin receiving a slide journal at the upper front end of the case on the approximate longitudinal median line thereof. The drop gears of the transfer case carry the drive to a lower-level output shaft 31 pointing rearwardly from the case, and co-axial with this rearwardly pointing output shaft and selectively brought into and out of couple therewith by a jaw-clutch is a forwardly pointing output shaft 32. The rearwardly and forwardly pointing output shafts act to carry the drive to the rear and to the front traction wheels, respectively, of the vehicle, hence providing for a dual drive but permitting the front wheels to be inactivated at will. It is usual in crash trucks to provide bogey rear axles, wherefor we have shown by dotted lines in Figs. 1 and 2 a drive shaft running rearwardly from a front bogey rear axle to a rear bogey rear axle (not illustrated). The two jaw-clutches, the one for coupling the input shafts and the other for coupling the output shafts, are operated by shuttle-pins 33 and 34, respectively, through shipping forks housed in the case.

Auxiliary transmission

We designate this unit by 14 and place the same to the rear of the transfer case offset laterally therefrom to the same side occupied by the power take-off of the main transmission. Input and output shafts 40 and 41 thereof project from the front and rear, respectively, and lie in approximately the same longitudinal vertical plane as that occupied by the output shaft 18 of the power take-off. Other than for an introduced fluid coupler 42, a direct driving connection is made through shafts 43 and 44 from said take-off shaft 18 to the input shaft 40. The unit which we employ transmits from the input shaft 40 to the output shaft 41 either a forward or reverse drive, selectively, through operation of respective housed friction clutches activated by a shipping spool. A shipping fork for the spool is operated by a pivot shaft the activated end 45 of which projects laterally from the transmission housing and has keyed thereto a lever 46. From the rearwardly directed output shaft of this auxiliary transmission, the auxiliary drive is carried laterally through a chain 48 to the rearwardly exposed input shaft 28 of the transfer case 15.

Reviewing the described units, it will be seen that forward and rearward movements given to the shuttle-pin 16 operates in the respective instance to activate and inactivate the power take-off. As to the pump, a forward movement of the shuttle-pin 24 disengages the main power shaft 23 from the power shaft 21 and coincidently establishes a driving connection from said shaft 23 to the pump proper, while a rearward movement of said shuttle-pin brings the shafts 21 and 23 into driving couple and coincidently inactivates the pump. Relative to the transfer case, there is here provided a shuttle-pin 29 acting by fore and aft movements to bring contained gearing into either of two speed-transferring ratios, selectively, and there are also provided two separate shuttle-pins 33 and 34 each slidable longitudinally of the vehicle. Forward and rearward movements given to the former of these shuttle-pins couples and uncouples, respectively, the two input shafts 26 and 28 and hence connects and disconnects the transfer case to and from the auxiliary transmission. The latter said shuttle-pin, and namely the pin 34, acts by forward and reverse movements, respectively, to clutch and de-clutch the output shaft of the transfer case to and from the vehicle's front axle. There remains to be considered only the auxiliary transmission, and here the lever 46 receives and imparts to the contained shipping spool the movement necessary to accomplish either a forward or reverse drive from the input shaft 40 to the output shaft 41, the arrangement being such that forward drive occurs when the lever is drawn forwardly and reverse drive occurs when the lever is drawn rearwardly.

For operating said pivot-mounted lever 46 and the several shuttle-pins 16, 24, 29, 33 and 34, there is provided a set of six hand-operated levers five of which, designated by 50, 51, 52, 53 and 54, are journaled intermediate their ends for pivot movement upon a horizontal cross-shaft 56 disposed to lie below the seat (not shown) which the driver of the vehicle occupies. So located, the said shaft lies in a transverse vertical plane more or less coinciding with the rear limit of the main transmission, hence locating the shaft to the rear of the power take-off and forwardly of the other named units contained in the described power-transmitting system. The cross-shaft is itself mounted for rocker movement in bearings 57 and 58, supported from a cross-member 60 shown bolted to the frame but which is, in actual practice bolted to the transmission case 11. The levers 50, 51, 52 and 53, with intervening and end collars 62, are desirably placed at the left side of the vehicle laterally removed from the longitudinal center line, and the fifth lever 54 occupies a position proximate to but spaced from the right end extremity of the cross-shaft. The sixth said lever is made up of two separate lever-arm complements each fixedly attached to the rock-shaft with the upstanding hand-operated power arm 63 being positioned outwardly of the lever 54 upon the right end extremity of the rock-shaft and the pendant arm 64 being located to the left of the vehicle's longitudinal center line inwardly from the grouped levers 50, 51, 52 and 53.

It is here pointed out that efficient operation of a crash truck requires both a driver and a pump operator each of which have specific duties to perform. These duties are concerned in part with a control of the several named units of our power-transmitting system, and it is to locate the controls in positions convenient to the reach of the concerned operator that the levers are positioned as described, and namely in two separate groups, one lying well to the left and the other well to the right of the vehicle's longitudinal center line. The driver of the vehicle operates the left-hand group of hand levers and, considered left to right in this group, the first lever 50 connects by a terminally forked rod 65 with the shuttle-pin 34 for de-clutching the front-wheel drive. The second lever 51 connects by a terminally forked rod 66 with the shuttle-pin 29 which permits of selecting either of two speed ratios within the transfer case. The third lever 52 connects by a terminally forked rod 67 with the forward-and-reverse lever 46 of the auxiliary transmission. The fourth lever 53, working through a terminally fork rod 68 and connecting lever 69, operates the shuttle-pin 33 which control the jaw-clutch for the input of auxiliary power to the transfer case. The pump operator controls the right-hand group of hand levers. The inner said lever 54 connects by a forwardly extending terminally forked rod 70 with the shuttle-pin 16 of the power take-off. The power lever-arm 63 which lies outwardly therefrom imparts rocking movements to the cross-shaft to responsively move the pendant work arm 64, wherefrom motion is carried through a terminally forked rod 71 to the shuttle-pin 24 for the pump.

There is important significance in the fact that we have so arranged the levers contained within the left hand group as to have the lever 53 which controls the delivery of auxiliary power into the transfer case lie immediately alongside the pump-controlling lever arm 64. This permits the utilization of an extremely simple form of interlock assuring that the sliding master gear contained within the pump housing cannot be moved rearwardly from its pump-driving position into a driving couple with the rearwardly extending output shaft 21 during periods when the jaw clutch, which establishes an auxiliary rear-end drive into the transfer case is in its operating forward position. The interlock which we provide is comprised simply of an L-shaped arm rigidly bolted by one leg 72 to the pump-controlling lever arm 64 and having its other leg 73 lying in an interruptive position to the front of the working arm 74 of the lever 53. Hence, when the master gear of the pump is in its rearward position passing the main drive into the input shaft 26, the working arm 74 is precluded by the leg 73 from being moved forwardly to bring the auxiliary drive shaft 28 into couple with said main input shaft. Conversely, the master gear of the pump is precluded from being shipped rearwardly out of pumping position into said driving couple with the transfer case's main input shaft 26 during periods when the auxiliary drive is being passed into the transfer case. Liability of the auxiliary drive fighting the main drive is consequently prevented.

It is thought that the invention and the manner of its operation will have been clearly understood from the foregoing description of our now preferred illustrated embodiment. With the power take-off inactivated and the auxiliary transmission isolated from the transfer case, and a driving couple established from the main output shaft of the transmission through the pump's master gear to the transfer case's main input shaft, the full power of the engine is then available for driving the vehicle to the scene of a crash. Reaching the crash scene, the pump operator by operation of the lever-arm 63 brings the master gear of the pump into driving engagement with the pump proper, thus inactivating the main drive to the transfer case, and at the same time, by operation of the lever 54, causes the power take-off to become active and carry the auxiliary drive through the auxiliary transmission to the normally free-running rear-end input shaft 28 of the transfer case. The drive to the front axle controlled by the de-clutching lever 50 is ordinarily inactivated by the driver at this time. Substantially the full power of the engine is now made available for the pump, the pump operator taking over the control of the engine, accelerating and de-accelerating as circumstances demand. As a need for shifting the truck arises, the driver, through operation of lever 53, is enabled to pass the auxiliary drive into the transfer case, having two speed ratios there available as well as forward and reverse control of the auxiliary transmission, using levers 51 and 52 in the respective instance. The system, as we have engineered the same, gives speeds of two to five miles per hour from the auxiliary drive.

It will perforce be understood that the pump, when throwing chemical upon a crash fire, draws its supply from tanks built into the truck. For simplicity in illustration, neither these tanks nor the fluid-carrying lines which lead to and from the pump are portrayed in the drawings.

In its broad aspect the invention lies in the concept of taking main an auxiliary power from a single power plant and through the instrumentality of controlled power-transmitting units making this main power available either to a heavy-duty pump or to the truck's driving wheels, alternatively, and while such main power is applied to the pump permitting the auxiliary power to be carried with full driving control to the driving wheels. It is self-evident, within this concept, that changes from the illustrated and described embodiment may be resorted to without departing from the spirit of the invention and it is accordingly our intention that no limitations be implied and that the hereto annexed claims be given a scope fully commensurate with the broadest interpretation to which the employed language admits.

What we claim, is:

1. In a crash truck equipped with a heavy-duty pump and having an engine, the combination with the pump and the engine: a main change-speed transmission powered by its input end off the engine and providing main and auxiliary output shafts so driven through the contained gears of the transmission that the speed range of the auxiliary output shaft is low by comparison with that of the main output shaft and consequently causes the auxiliary output shaft to consume only a minor part of the available power of the engine, alternatively activated means one operating to establish a driving connection from the main output shaft to the driving wheels of the truck and the other operating to establish a driving connection from said main output shaft to the pump, means being provided whereby the activation of either of said connections inactivates the other, means for establishing a driving connection from said auxiliary output shaft to the driving wheels of the truck, and means operating automatically to hold the auxiliary output shaft disconnected from the driving wheels when the main output shaft is connected to said wheels and to hold the main output shaft disconnected from the driving wheels when the auxiliary output shaft is connected to said wheels.

2. In a crash truck having an engine supported at the front end thereof and providing a change-speed forward-and-reverse main transmission mounted to occupy a position to the immediate rear of the engine, said transmission presenting rearwardly-pointing main and auxiliary power-output shafts of which the former lies on the approximate longitudinal median line of the truck and the latter is removed laterally to one side thereof, a transfer case spaced at some distance to the rear of the transmission, connected by a lower-level output shaft to the driving wheels of the truck, and providing upper-level primary and secondary input shafts positioned in the approximate longitudinal median line of the truck with the former shaft pointing forwardly and the latter shaft pointing rearwardly from the transfer case, an auxiliary forward-and-reverse transmission located to the rear of the transfer case and removed laterally therefrom to the same side as that occupied by the auxiliary power shaft, a normally inactive driving connection from the output end of said auxiliary transmission to the secondary input shaft of the transfer case, manually controlled means for activating said connection, a heavy-duty pump located on the approximate longitudinal median line of the truck between the main transmission and the transfer case, normally inactive driving connections one from the main power shaft to the pump and the other from the main power shaft to the primary input shaft of the transfer case, manually controlled means for activating either of said last-named connections, alternatively, a longitudinally extending drive line from the auxiliary power shaft to the input end of said auxiliary transmission, and means producing an interlock between the recited manually controlled activating means precluding transfer of power to the driving wheels from both the main and the auxiliary power shafts simultaneously.

3. The structure of claim 2 having manually controlled means by which the drive line from the auxiliary power shaft to the auxiliary transmission may be activated or inactivated at will.

4. Structure according to claim 2 in which the driving connection from the auxiliary transmission to the secondary input shaft of the transfer case includes a speed reducing transfer chain.

5. In a crash truck equipped with a heavy-duty pump and having an engine and an engine-driven change-speed transmission, said transmission providing both a main power output and an auxiliary power take-off with the auxiliary take-off characterized in that the speed is quite low by comparison with the speed of the main power output so that said auxiliary take-off will at no time consume more than a minor part of the engine's available power, the combination with said pump, the engine, and said engine-driven transmission: alternatively activated connections for drive-coupling said main power output of the transmission to either the traction wheels of the truck or to the pump; a clutch-controlled drive connection from said auxiliary take-off to the traction wheels of the truck; the clutch for said drive connection; and means automatically holding the clutch in a de-clutching position when power from the main output is being carried to the wheels.

6. In a crash truck equipped with a heavy-duty pump and having an engine and an engine-driven change-speed main transmission, said transmission providing both a main power output and an auxiliary power take-off with the auxiliary take-off characterized in that the speed is quite low by comparison with the speed of the main power output so that said auxiliary take-off will at no time consume more than a minor part of the engine's available power, the combination with said pump, the engine, and said engine-driven transmission: an auxiliary change-speed transmission powered from said auxiliary take-off and constructed to give either a forward or reverse output, selectively; a plurality of manually operated controls one of which selects either a forward or a reverse output for the auxiliary transmission; a transfer case having driving connection with the traction wheels of the truck; respective connections operated by others of said controls for bringing the auxiliary transmission into driving couple with the transfer case and bringing said main power output of the main transmission into driving couple either with the pump or with the transfer case; and a safety lock operatively interconnected with the latter controls so as to prevent both the auxiliary transmission and the main power output from being simultaneously drive-coupled to the transfer case.

7. In a crash truck equipped with a heavyduty pump and having an engine and an engine-driven change-speed main transmission, said main transmission providing both a main power output and an auxiliary power take-off with the auxiliary take-off characterized in that the speed is quite low by comparison with the speed of the main power output so that said auxiliary take-off will at no time consume more than a minor part of the engine's available power, the combination with said pump, the engine, and said engine-driven main transmission: an auxiliary change-speed transmission powered from said auxiliary take-off and constructed to give either a forward or reverse output, selectively; a plurality of manually operated controls one of which selects either a forward or a reverse output for the auxiliary transmission; a transfer case having driving connection with the traction wheels of the truck; drive lines leading from said main power output both to the pump and to the transfer case; and a drive line from the auxiliary transmission to the transfer case, others of said manually operated controls controlling said drive lines, means being provided operating automatically in conjunction with the operation of said controls for the drive lines allowing the power of said main power output to be passed into the pump or into the transfer case, alternatively, and permitting the auxiliary transmission to pass power into the transfer case only when the latter is isolated from said main power output.

8. In a crash truck equipped with a heavyduty pump and having an engine and an engine-driven transmission providing both a main and an auxiliary power output with the auxiliary power output characterized in that the speed is quite low by comparison with the speed of the main power output so that said auxiliary power output will at no time consume more than a minor part of the engine's available power, the combination with said pump, the engine, and said engine-driven transmission: manually controlled driving connections running to the traction wheels of the truck both from the main and from the auxiliary power output and also running to the pump from said main power output; and the controls for said connections, means being provided operatively interconnected with the controls allowing power for the traction wheels to be drawn alternatively from either one or the other but not from both power outputs simultaneously and also permitting the power for the pump to be drawn from said main power output only when the main power output is isolated from the traction wheels.

9. In a dual-drive crash truck equipped with a heavy-duty pump and having an engine and a transmission driven from said engine, the transmission providing both a main power output and an auxiliary power take-off with the auxiliary take-off characterized in that the speed is quite low by comparison with the speed of the main power output so that said auxiliary power output will at no time consume more than a minor part of the engine's available power, the combination with said pump, the engine, and said engine-driven transmission: a transfer case having driving connection with the front and rear traction wheels of the truck; means for passing the power of the main output into either the pump or the transfer case, alternatively; means for passing the power of the auxiliary take-off into said transfer case; and devices functional to said recited means serving to control the latter and so interconnected one with another said device as to permit power to be passed into the transfer case from either the main output or the auxiliary take-off, alternatively, means being provided for activating or inactivating the drive from the transfer case to the front traction wheels at will.

10. In a dual-drive crash truck equipped with a heavy-duty pump and having an engine and a main transmission driven from said engine, the transmission providing both a main power output and an auxiliary power take-off with the auxiliary take-off characterized in that the speed is quite low by comparison with the speed of the main power output so that said auxiliary power output will at no time consume more than a minor part of the engine's available power, the combination with said pump, the engine, and said engine-driven transmission: a transfer case connecting by its output end with the front and rear traction wheels of the truck; means for inactivating the connection between said transfer case and the front traction wheels at will; alternatively activated connections establishing a driving couple from the transmission's main output to either the pump or the input end of the transfer case; and a connection including an auxiliary forward-and-reverse transmission for establishing a driving couple from said auxiliary take-off to said input end of the transfer case, means being provided whereby the auxiliary drive from said auxiliary take-off may be made active upon the transfer case only when the latter is isolated from the power of the main output.

11. In a dual-drive crash truck equipped with a heavy-duty pump and having an engine and a main transmission driven from said engine, the transmission providing both a main power output and an auxiliary power take-off with the auxiliary take-off characterized in that the speed is quite low by comparison with the speed of the main power output so that said auxiliary power output will at no time consume more than a minor part of the engine's available power, the combination with said pump, the engine, and said engine-driven transmission: a transfer case connecting by its output end with the front and rear traction wheels of the truck; means for inactivating the connection between said transfer case and the front traction wheels at will; alternatively activated connections establishing a driving couple from the transmission's main output to either the pump or the input end of the transfer case; and a connection including a fluid coupling and an auxiliary forward-and-reverse transmission for establishing a driving couple from said auxiliary take-off to said input end of the transfer case, means being provided whereby the auxiliary drive from said auxiliary take-off may be made active upon the transfer case only when the latter is isolated from the power of the main output.

12. In a dual-drive crash truck equipped with a heavy-duty pump and having an engine and a main transmission driven from said engine, the transmission providing both a main power output and an auxiliary power take-off with the auxiliary take-off characterized in that the speed is quite low by comparison with the speed of the main power output so that said auxiliary power output will at no time consume more than a minor part of the engine's available power, the combination with said pump, the engine, and said engine-driven transmission: a two-speed transfer case; connections establishing a driving couple from the output end of the transfer case to the front and rear traction wheels of the truck; a clutch for inactivating the drive connection to the front wheels; a drive line leading from the main power output; means for establishing a driving couple from said drive line to the pump or to the transfer case, alternatively; an auxiliary forward-and-reverse transmission; drive lines from said auxiliary take-off to the input end of the auxiliary transmission and from the output end of the auxiliary transmission to the input end of the transfer case; a clutch for inactivating the last mentioned drive line; and manual controls for operating the two clutches, for selecting the speeds of the transfer case and also the directional output of the auxiliary transmission, and for bringing the main drive into its permitted alternative couple with either the pump or the transfer case.

13. The crash truck of claim 12 in which the control for said second-named clutch and the control by which the main drive is brought into selective couple with either the pump or the transfer case provides a safety lock precluding the main drive line and the auxiliary drive line from being simultaneously brought into driving couple with the transfer case.

References Cited in the file of this patent
UNITED STATES PATENTS

| | | |
|---|---|---|
| 2,034,778 | Storey | Mar. 24, 1936 |
| 2,344,388 | Bixby | Mar. 14, 1944 |